(12) United States Patent
Martens et al.

(10) Patent No.: US 11,097,216 B2
(45) Date of Patent: Aug. 24, 2021

(54) LIQUID SEPARATOR WITH IMPROVED FILTER SERVICE ACCESS AND DEDICATED FILTER SERVICE REPLACEMENT TOOL

(71) Applicant: ATLAS COPCO AIRPOWER, NAAMLOZE VENNOOTSCHAP, Wilrijk (BE)

(72) Inventors: Kristof Adrien L. Martens, Wilrijk (BE); Steven Maurits R. Laurent, Wilrijk (BE); Walter Josee L. Adriaenssens, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 14 days.

(21) Appl. No.: 16/479,970

(22) PCT Filed: Jan. 18, 2018

(86) PCT No.: PCT/IB2018/050309
§ 371 (c)(1),
(2) Date: Jul. 23, 2019

(87) PCT Pub. No.: WO2018/134758
PCT Pub. Date: Jul. 26, 2018

(65) Prior Publication Data
US 2019/0336900 A1    Nov. 7, 2019

Related U.S. Application Data

(60) Provisional application No. 62/449,287, filed on Jan. 23, 2017.

(30) Foreign Application Priority Data

Oct. 16, 2017    (BE) .................................. 2017/5741

(51) Int. Cl.
*B01D 46/00* (2006.01)
*B01D 46/24* (2006.01)
(Continued)

(52) U.S. Cl.
CPC ....... *B01D 46/0005* (2013.01); *B01D 46/002* (2013.01); *B01D 46/008* (2013.01);
(Continued)

(58) Field of Classification Search
CPC ...... B01D 29/52; B01D 29/54; B01D 46/005; B01D 46/002; B01D 46/0021;
(Continued)

(56) References Cited

U.S. PATENT DOCUMENTS 2,357,943 A * 9/1944 Feagley et al. ........ B01D 29/66
                                                                      210/333.01
6,270,670 B1    8/2001 Jackovich
(Continued)

FOREIGN PATENT DOCUMENTS

DE    102010053055 A1    6/2011
FR        2308856 A1   11/1976
(Continued)

OTHER PUBLICATIONS

International Search Report and Written Opinion in corresponding PCT Application No. PCT/IB2018/050309, dated Aug. 7, 2018.
(Continued)

*Primary Examiner* — Benjamin M Kurtz
(74) *Attorney, Agent, or Firm* — Bacon & Thomas, PLLC

(57) ABSTRACT

A liquid separator including a vessel with an inlet for a liquid/gas mixture, where this vessel defines a space which at the top is closed by a cover, where the liquid separator is provided with an outlet for treated gas, where in the space a shield is provided that extends around the outlet and which has a bottom wall with one or more inlet openings, where a
(Continued)

chamber is defined by the shield, the bottom wall and the cover. In the formed chamber at least one filter element is provided that extends from the bottom wall around the inlet opening, such that between the shield and the filter element an outlet zone is defined which is in connection with the outlet, where in the cover a small removable cover is provided above each filter element.

14 Claims, 4 Drawing Sheets

(51) Int. Cl.
*B01D 46/42* (2006.01)
*B01D 50/00* (2006.01)

(52) U.S. Cl.
CPC ..... *B01D 46/2414* (2013.01); *B01D 46/4227* (2013.01); *B01D 2265/028* (2013.01)

(58) Field of Classification Search
CPC .............. B01D 46/008; B01D 46/4227; B01D 2201/0438; B01D 2201/4015; B01D 2201/4023; B01D 2201/4046; B01D 27/08; B01D 35/306
See application file for complete search history.

(56) References Cited

U.S. PATENT DOCUMENTS

| | | | |
|---|---|---|---|
| 2004/0256965 A1* | 12/2004 | Koons | F25D 23/021 312/405 |
| 2007/0125048 A1 | 6/2007 | Hunsinger et al. | |
| 2016/0236127 A1* | 8/2016 | Cools | F01D 11/001 |

FOREIGN PATENT DOCUMENTS

| | | |
|---|---|---|
| JP | H05-502095 A | 4/1993 |
| JP | H09253436 A | 9/1997 |
| WO | 9103689 A1 | 3/1991 |
| WO | 2015048860 A2 | 4/2015 |
| WO | 2015107610 A1 | 7/2015 |

OTHER PUBLICATIONS

Written Opinion of the International Preliminary Examining Authority in corresponding PCT Application No. PCT/IB2018/050309, dated Dec. 14, 2018.

* cited by examiner

LIQUID SEPARATOR WITH IMPROVED FILTER SERVICE ACCESS AND DEDICATED FILTER SERVICE REPLACEMENT TOOL

The present invention relates to a liquid separator.

The invention more specifically relates to a liquid separator comprising a vessel with an inlet for a liquid/gas mixture, whereby this vessel defines a space which at the top is closed by means of a cover, whereby the liquid separator is provided with an outlet for treated gas, whereby in the aforementioned space a shield is provided which extends around the aforementioned outlet whereby inside the shield a filter element is provided, such that an outlet zone is defined between the shield and the filter element.

BACKGROUND OF THE INVENTION

It is known that a filter element is a heavy and bulky part that is not easy to take out when saturated with oil.

Liquid separators are already known whereby the filter element is replaced by different separate filter elements in a modular setup.

Consequently, the separate filter elements are smaller and lighter, such that they are easier to take out, even when saturated with oil.

One such modular type of liquid separator is described in the international patent application WO 2015/048860, whereby the shield is provided with a bottom wall with one or more inlet openings, whereby filter elements by means of snap on connections can be mounted on the bottom wall, above an inlet opening.

These known installations have the disadvantage that replacing the filter elements requires removing and opening the cover. That cover is a heavy part and different connections need to be disconnected before it can be removed.

These connections concern, inter alia but not restricted to this, the outlet for treated gas, a blow-off line, the pipe to discharge separated liquid, a tube to measure the differential pressure, etc.

The consequence is that taking out and changing a filter element is a time-consuming and difficult job as all connections first need to be disconnected and correctly installed again afterward.

Furthermore, during this whole time the machine, in which the liquid separator is used, is not available.

SUMMARY OF THE INVENTION

The purpose of the present invention is to provide a solution to at least one of the aforementioned and other disadvantages.

The object of the present invention is a liquid separator comprising a vessel with an inlet for a liquid/gas mixture, whereby this vessel defines a space which at the top is closed by means of a cover, whereby the liquid separator is provided with an outlet for treated gas, whereby in the aforementioned space a shield is provided that extends around the aforementioned outlet and which comprises a bottom wall with one or more inlet openings, whereby a chamber is defined by the shield, the bottom wall and the cover, whereby in the thus formed chamber at least one filter element is provided that extends from the bottom wall around the inlet opening, such that between the shield and the filter element an outlet zone is defined which is in connection with the aforementioned outlet, characterised in that in the aforementioned cover a small removable cover is provided above each filter element.

This provides the advantage that taking out and/or replacing a filter element will not only be easier, but much quicker too.

Not only does the big, heavy cover of the vessel no longer have to be removed, only the small removable cover does, none of the connections of the cover have to be disconnected and reconnected afterwards, as these connections are located in the cover of the vessel and this cover does not have to be removed.

Another advantage is that there is no risk of an incorrect reconnection of the connections, resulting in any problems, malfunctions or even failures and defects.

Preferably the filter element is provided with a cap or cover element at the top, whereby on this cap or cover element an elevation is provided, whereby a cut-away is provided in the elevation that can be opened with a tool provided with a detailing with a form that is complementary to the cut-away.

The advantage of such embodiment is that by means of the tool, the filter element can be very easily taken out of the liquid separator, by letting the tool, by means of the detailing, co-operate with the cut-away to thus lift the filter element out of the liquid separator.

In a preferred embodiment the small removable cover is provided at the bottom with a cavity that is complementary to the elevation of the aforementioned cap.

An advantage of this is that consequently a check of the position of the filter element is incorporated, as the small removable cover can only be placed if the filter element is correctly oriented. Without a correct angular orientation, the elevation will not fit in the cavity, such that the small removable cover cannot be attached to the cover of the vessel.

Furthermore, the filter element will not be able to twist when the small removable cover is mounted.

The invention also relates to a tool to service a liquid separator according to the invention characterised in that the tool is provided with a detailing with a form that is complementary to the cut-away in the cap or the cover element of the filter element.

Using such tool the filter elements can be taken out of the liquid separator.

BRIEF DESCRIPTION OF THE DRAWINGS

With the intention of better showing the characteristics of the invention, a few preferred embodiments of a liquid separator according to the invention and a tool to service such liquid separator are described hereinafter by way of an example without any limiting nature, with reference to the accompanying drawings, wherein.

DETAILED DESCRIPTION OF THE INVENTION

Figure 1:
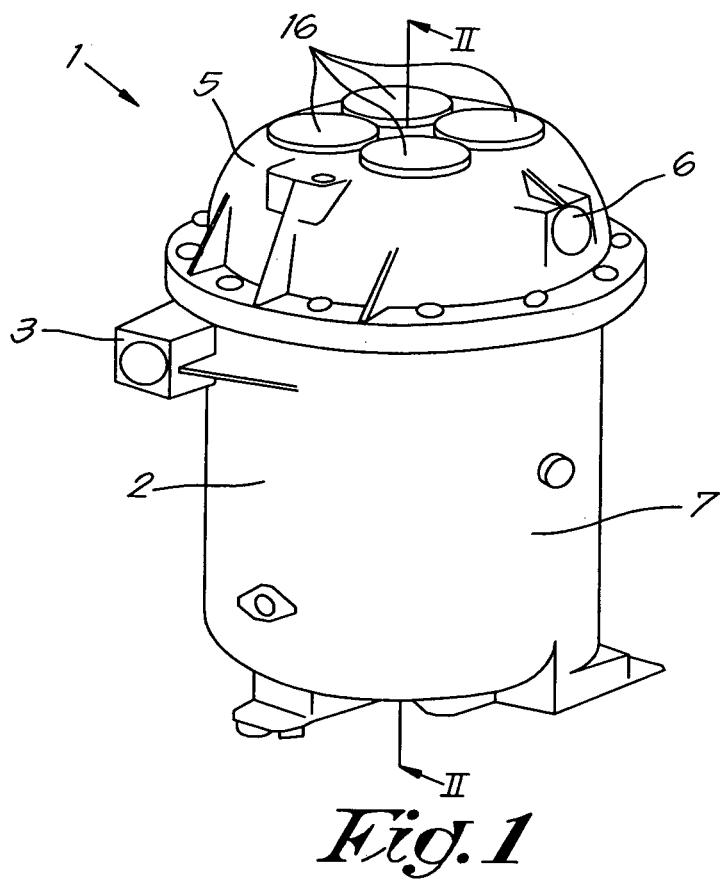
FIG. 1 schematically shows a perspective view of a liquid separator according to the invention.

The liquid separator schematically shown in FIG. 1 comprises a vessel 2 with an inlet 3 for a liquid/gas mixture, such as for example, but not necessary for the invention, compressed air and oil coming from an oil-injected compressor.

The vessel 2 defines a space 4 which at the top is closed by means of a cover 5.

Figure 2:
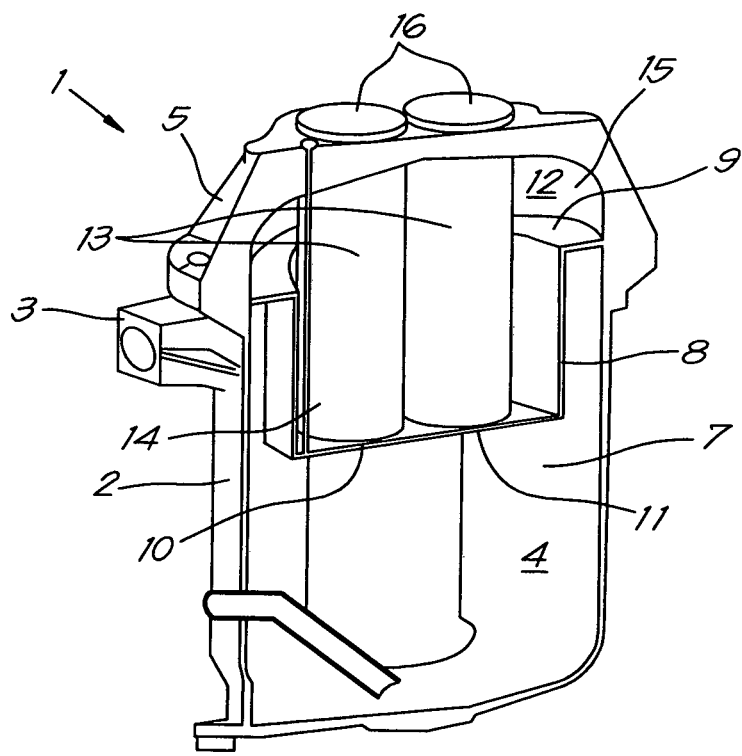
FIG. 2 shows the cross-section according to the line II-II of FIG. 1.

An outlet 6 has also been provided for treated gas. In the example of FIGS. 1 and 2 this outlet 6 is provided in the cover 5, but this is not necessary for the invention.

Figure 3:
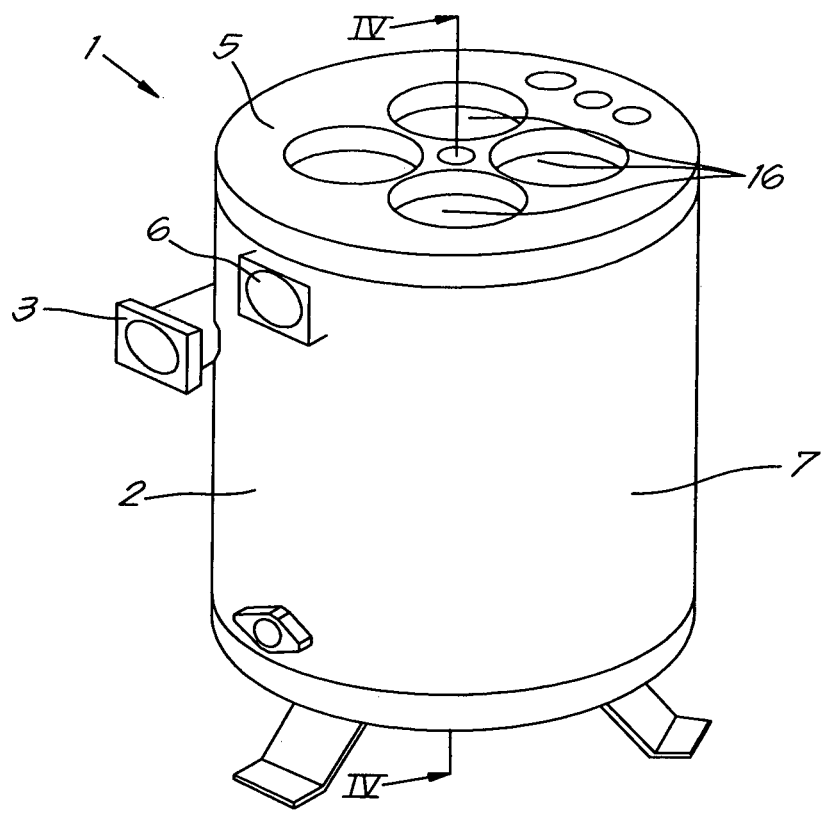
FIG. 3 shows an alternative embodiment of FIG. 1.
Figure 4:
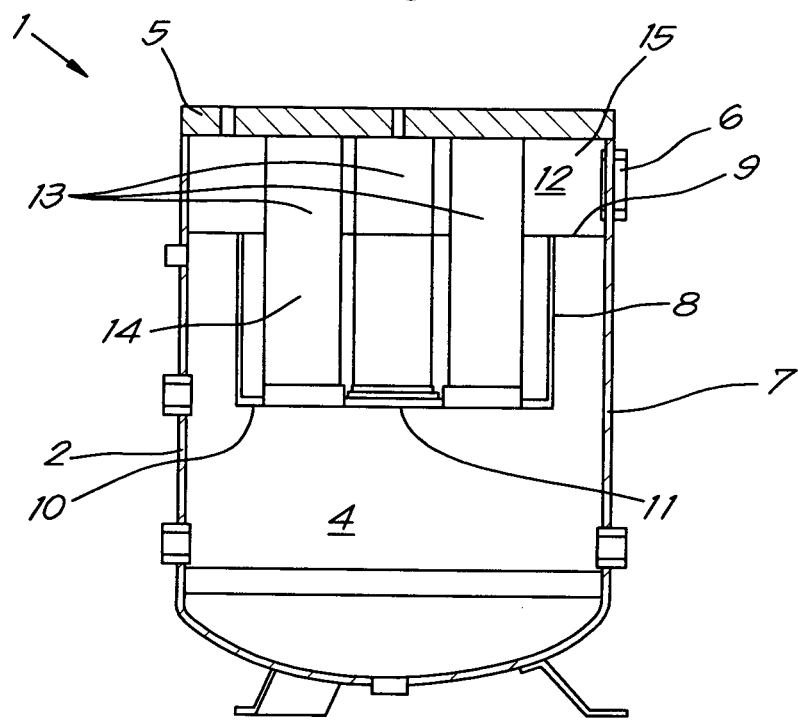
FIG. 4 shows the cross-section according to the line IV-IV of FIG. 3.

In the embodiment of FIGS. 3 and 4 the outlet 6 is provided in the sidewall 7 of the vessel 2. It is not excluded that in this embodiment the outlet 6 is provided in the cover 5, such as in FIGS. 1 and 2.

In the aforementioned space 4 a shield 8 is provided that extends around the aforementioned outlet 6.

To this end the shield 8 is provided with a collar or flange 9 in both embodiments. In FIGS. 1 and 2 this collar and flange 9 are attached at the level of the cover 5, such that the shield 8 extends from the aforementioned cover 5, and in FIGS. 3 and 4 this collar or flange 9 is attached to the sidewall of the vessel.

In this way it is possible to ensure that the shield 8 extends around the outlet 6 in both embodiments.

The shield 8 is provided with a bottom wall 10 with one or more inlet openings 11.

In this case, but not necessarily, the bottom wall 10 is an integral part of the shield 8. This is essentially to simplify the production of the liquid separator 1.

The shield 8, the bottom wall 10 and the cover 5 define a chamber 12. Because the shield 8 extends around the outlet 6, the chamber 12 will be in connection with the outlet 6. However, this chamber 12 is not directly in connection with the inlet 3.

At least one filter element 13 is located in this chamber 12 that extends from the bottom wall 10 around an inlet opening 11.

In the shown embodiments four filter elements 13 are provided, each with an accompanying inlet opening 11. However, it is also possible only two or three filter elements 13 are provided or more than four, e.g. 5, 6, 7 or 8.

Every filter element 13 is provided with a filter 14 made of a suitable filter material.

As is clearly visible in the figures, an outlet zone 15 is defined between the shield 8 and the filter elements 13 which is in connection with the aforementioned outlet 6.

According to the invention a small removable cover 16 is provided above each filter element 13 in the aforementioned cover 5.

Four such small removable covers 16 are provided in the shown examples.

These small removable covers 16 can be screwed on the cover 5 or using one or more bolts or screws.

As there are several filter elements 13 in the shown examples, in this case four, a corresponding small removable cover 16 is provided for each filter element 13.

Figure 5:
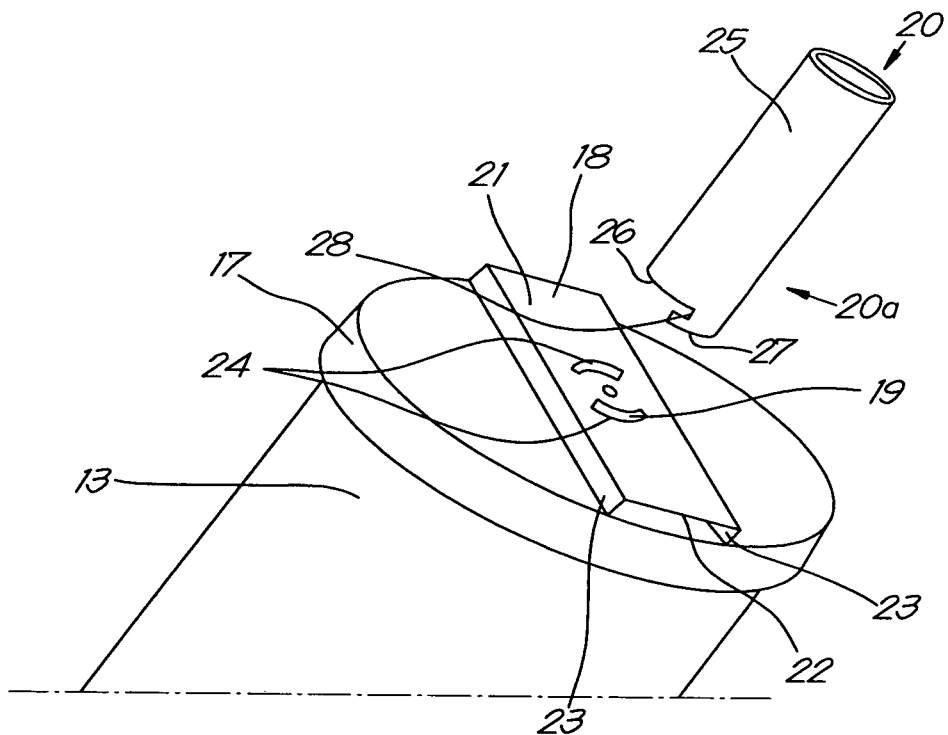
FIGS. 5 to 8 show different views of a number of parts of a liquid separator according to the invention.

According to a preferred embodiment, as shown in FIG. 5, the filter element 13 is provided with a cap 17 or cover element at the top, whereby on this cap 17 or cover element an elevation 18 is provided, whereby a cut-away 19 is provided in the elevation 18 that can work with a tool 20 provided with a detailing 20a with a form complementary to the cut-away 19.

Such cap 17 is applicable both in the embodiment of FIGS. 1 and 2 and in the embodiment of FIGS. 3 and 4.

The aforementioned tool 20 is also shown in FIG. 5, and shows that the tool 20 is provided with a detailing 20a with a form that is complementary to the cut-away 19 in the cap 17 or cover element of the filter element 13.

Using the tool 20, a filter element 13 can be taken out of the liquid separator 1, by letting the detailing 20a work with the cut-aways 19 in the elevation 18 of the cap 17 of the filter element 13.

The elevation 18 can be done in different ways. In order to obtain the lightest possible filter element 13, the elevation 18 in FIG. 5 is formed by a U-shaped profile 21 with a bottom 22 and two upright arms 23, which are attached to the cap 17 with the free ends of the upright arms 23.

As is visible in FIG. 5, the cut-away 19 in the bottom is made in the form of arcs 24. In this case, but not necessarily, the arcs 24 have the same centre.

As shown in FIG. 5, the tool 20 comprises a hollow tubular part 25, whereby the circular edge 26 of the tubular part 25 is provided with at least one arch-shaped extension 27 in the axial direction, whereby this extension 27 is provided with at least one notch 28 in the axial edge of the extension 27, whereby the notch 28 extends in the circumferential direction of the tubular part 25.

Because the arcs 24 have the same centre, the rotation of the tool 20 means the tool 20 will be able to couple with the cap 17 as it were whereby the extension 27 will be able grip with its notch 28 in the arcs 24. By subsequently moving the tool 20 axially away from the liquid separator 1, the 'coupled' filter element 13 will be taken out of the liquid separator 1.

Figure 6:
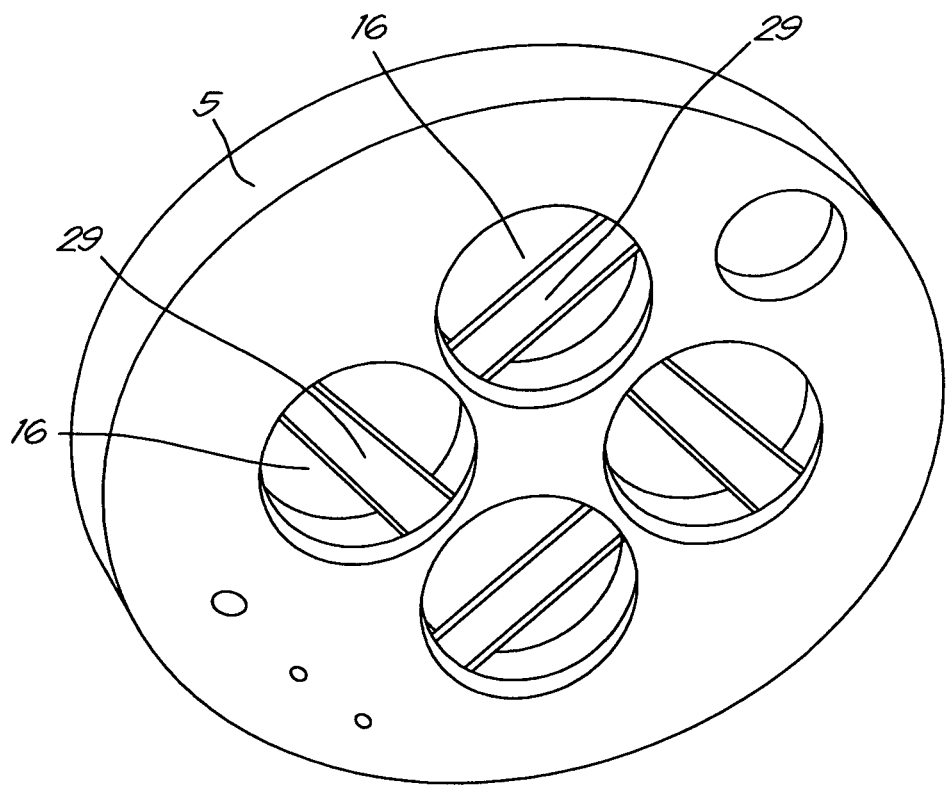
Figure 7:
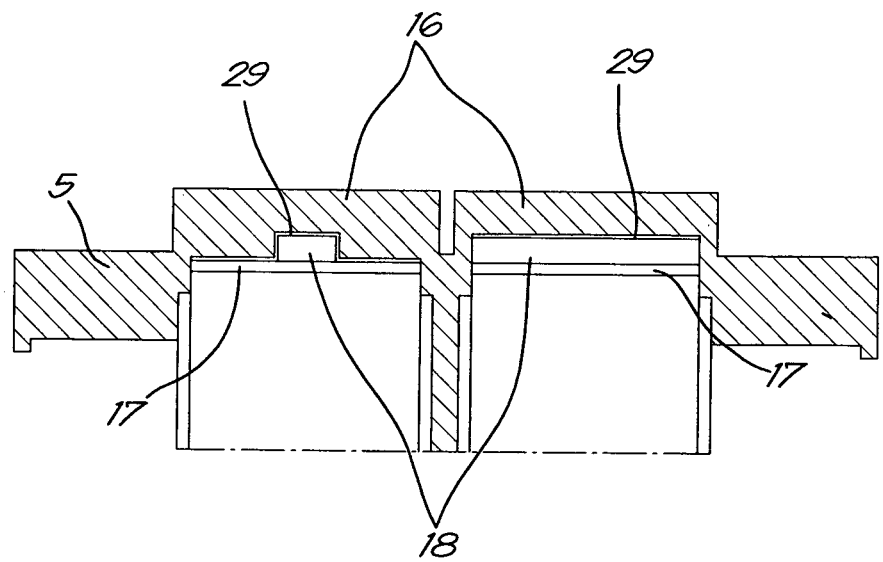

In a preferred embodiment, as shown in FIGS. 6 and 7, the small removable covers 16 at the bottom are provided with a cavity 29 which is complementary to the elevation 18 of the cap 17.

FIG. 6 shows a bottom view of the cover 5 on which the small removable covers 16 are mounted, whereby the aforementioned cavities 29 are clearly visible.

FIG. 7 shows a cross-section of the cover 5 of the vessel 2 with the filter elements, which shows how the cavities 29 fit over the elevations 18.

As already mentioned, such cavity 29 will guarantee a correct positioning of the filter element 13. After all, if the filter element 13 is not fitted against the bottom wall 10 of the shield 8 or is incorrectly oriented, the cavity 29 will not fit over the elevation 18 of the cap 17 and the small removable cover 16 cannot be attached to the cover 5 of the vessel 2.

The operation of the installation 1 is simple and as follows.

When a liquid/gas mixture goes via the inlet 3 in the vessel 5, there is a pre-separation of liquid in a first phase.

The cyclonic flow of the liquid/gas mixture between the sidewall 7 of the vessel 2 and the shield 8 inside the vessel 2 in the space 4 means the heavier liquid particles are slung to the sidewall 7 of the vessel 2 and they collect at the bottom of the vessel 2.

In the next phase the mixture flows through the inlet opening 11 in the bottom wall 10 of the shield 8 through the filter element 13 and thus ends up in the outlet zone 15.

When the mixture goes through the filter 14, the next separation phase takes place.

The treated gas in the outlet zone 15 leaves the vessel 2 via the outlet 6.

The liquid that is filtered by the filter element 13 is collected at the bottom in the chamber 12 and discharged.

It is possible that the shield 8 is fitted with an integrated discharge pipe, to remove the liquid that is separated by the filter elements 13 which collected on the bottom wall 10 from the liquid separator 1.

By integrating this discharge pipe in the shield 8 itself, instead of providing a separate discharge pipe, the liquid separator 1 will be a lot more robust.

It is not excluded that other detachable or removable parts of the liquid separator 1 are provided with the cut-aways 19 as those provided on the cap 17 of the filter elements 13.

E.g. thermostatic valves and the like. Bolts and screws can be provided with the same cut-aways 19 instead of the traditional hexagonal or cross-shaped cut-away.

This means the parts can be loosened, twisted, removed or replaced using the same tool 20.

It is not excluded either that the liquid separator 1 is part of a compressor installation comprising at least one compressor element to compress a gas, whereby one or more detachable or removable parts of the compressor installation are provided with the aforementioned cut-away 19.

Because of this the tool 20 can also be used to loosen, twist, remove or replace these parts.

The aforementioned parts may concern oil filters or covers of thermostats for example.

It is also possible that in a further simplified embodiment, the vessel 2 and the cover 5 form one whole, in other words that the cover 5 of the vessel 2 is not removable. That results in a fully enclosed vessel 2, for example whereby the shield 8 is fixed in the vessel 2. That results in a cheaper assembly of the liquid separator 1.

It is also possible that connection means are provided to attach the filter elements 13 to the bottom wall 10.

These connection means can comprise a snap-on connection, for example. This snap-on connection gives tactile feedback in case of correct installation when mounting the filter element 13.

Preferably such connection means consist of two co-operating parts, whereby one part is provided on the bottom wall 10 and the other part on the filter element 13 itself.

In this way the connection means can consist of a female and a male part for example.

Although in the previous embodiments the cap 17 is provided in an elevation 18 on the cap 17, it is not excluded that the filter element 13 is fitted with a cap 17 or cover element at the top, whereby this cap 17 or cover element is provided with a double wall, whereby in the double wall a cut-away 19 is provided that can be opened with a tool 20 that is provided with a detailing 20a with a form that is complementary to the cut-away 19.

In this case the removable cover 16 will not be provided with a cavity 29 at the bottom.

Figure 8:
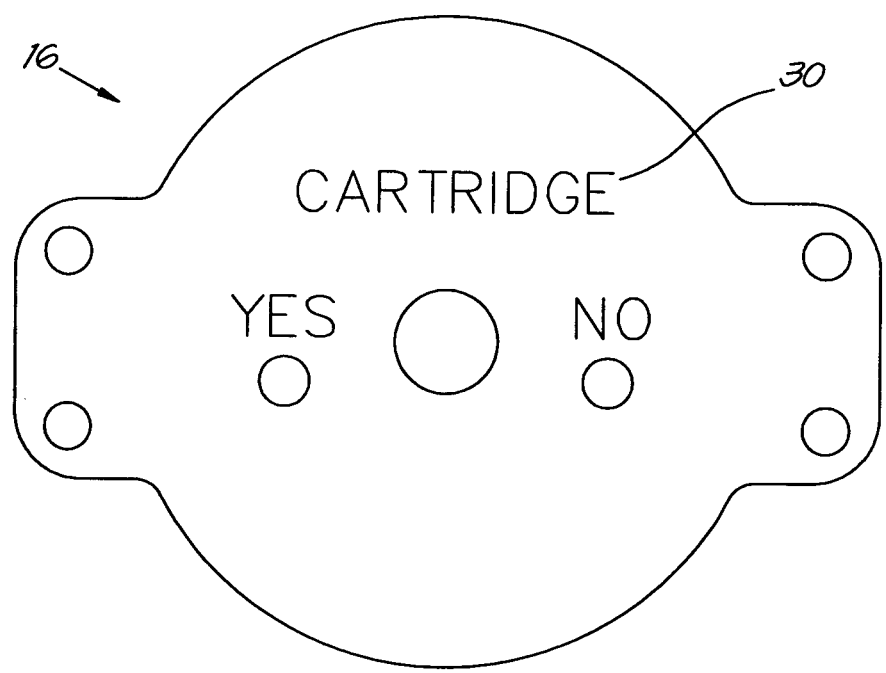

In FIG. 8 a variant embodiment is shown of a removable cover 16, whereby on the cover 16 a marking 30 or indication is applied which shows whether there is a filter element 13 under the cover 16.

The liquid separator 1 with different filter elements 13 as shown in FIGS. 1 and 2 is a modular system. This means it is possible that not all openings 11 are filled with a filter element 13, depending on the application in which the liquid separator 1 is applied, in particular of the flow or the air speeds through the liquid separator 1.

The unused openings 1 can be closed, for example with a plug or the like.

That is why on the removable covers 16 the marking 30 indicates whether a filter element 13 is fitted under the cover 16 in question, such that, when you want to replace or take out the filter elements 13, only the covers 16 are opened whereby it is indicated that a filter element 13 is effectively fitted.

This means it is possible to avoid that all covers 16 need to be removed, such that the time required to take out or replace the filter elements 13 is as short as possible.

The present invention is by no means limited to the embodiments described as an example and shown in the figures, but a liquid separator according to the invention and tools to service such liquid separator can be realised in all kinds of forms and dimensions, without departing from the scope of the invention.

The invention claimed is:

1. A liquid separator comprising:
   a vessel with an inlet for a liquid/gas mixture,
   wherein the vessel defines a space which at a top of the space is closed by means of a cover,
   wherein the liquid separator is fitted with an outlet for treated gas,
   wherein in the space a shield is provided that extends around the outlet and which comprises a bottom wall with one or more inlet openings,
   wherein a chamber is defined by the shield, the bottom wall and the cover,
   wherein in the chamber at least one filter element is provided that extends from the bottom wall around the inlet opening, such that between the shield and the at least one filter element an outlet zone is defined which is in connection with the outlet, and
   wherein, in the cover, a removable cover is provided above the at least one filter element,
   wherein the at least one filter element is fitted with a cap or cover element at a top of the at least one filter element, wherein on the cap or cover element an elevation or a double wall is provided, wherein on a top surface of the elevation or the double wall a cut-away is provided that is configured so that the cap or cover element is able to be rotated with a tool that is fitted with a detailing with a form that is complementary to the cut-away.

2. The liquid separator according to claim 1, wherein the outlet is provided in the cover and that the shield extends from the aforementioned cover.

3. The liquid separator according to claim 1, wherein the removable cover is attached to the cover using attachment means, wherein the attachment means allow the removable cover to be loosened again.

4. The liquid separator according to claim 3, wherein the attachment means comprise one or more bolts, or screws.

5. The liquid separator according to claim 1, wherein several filter elements are provided, wherein for each filter element a corresponding removable cover is provided.

6. The liquid separator according to claim 1, wherein the vessel and the cover form one whole.

7. The liquid separator according to claim 1, wherein the bottom wall is an integral part of the shield.

8. The liquid separator according to claim 1, wherein the elevation is formed by a U-shaped profile with a bottom and two upright arms, which is attached to the cap with the free ends of the upright arms.

9. The liquid separator according to claim 1, wherein the removable cover on a bottom is provided with a cavity which is complementary to the elevation of the cap.

10. The liquid separator according to claim 1, wherein the cut-away in a bottom thereof is made in the form of arcs.

11. The liquid separator according to claim 10, wherein the arcs have the same centre.

12. The liquid separator according to claim 1, wherein connection means are provided to attach the at least one filter element to the bottom wall of the shield.

13. The liquid separator according to claim 12, wherein the connection means consist of two co-operating parts, wherein one part is provided on the bottom wall and the other part on the at least one filter element.

14. A compressor installation, comprising at least one compressor element to compress a gas, wherein the compressor installation is provided with a liquid separator according to claim 1 and wherein one or more detachable or removable parts of the compressor installation are provided with the aforementioned cut-away.

* * * * *